(12) United States Patent
Hagelthorn

(10) Patent No.: US 7,000,995 B2
(45) Date of Patent: Feb. 21, 2006

(54) HIGH-INTEGRITY INTERLOCKING NUT AND WASHER SYSTEM

(76) Inventor: George Allan Hagelthorn, 414 S. York, Dearborn, MI (US) 48124

( * ) Notice: Subject to any disclaimer, the term of this patent is extended or adjusted under 35 U.S.C. 154(b) by 146 days.

(21) Appl. No.: 10/414,920

(22) Filed: Apr. 16, 2003

(65) Prior Publication Data

US 2004/0207248 A1 Oct. 21, 2004

(51) Int. Cl.
B60B 21/00 (2006.01)

(52) U.S. Cl. ............................. 301/105.1; 301/124.1; 411/216; 411/939; 411/948

(58) Field of Classification Search ............ 301/105.1, 301/111.01, 114, 124.1; 384/540, 562, 563, 384/583; 411/129, 131, 132, 133, 140, 191, 411/216, 217, 197, 199, 939, 948
See application file for complete search history.

(56) References Cited

U.S. PATENT DOCUMENTS

| 3,294,141 | A | * | 12/1966 | Schotthoefer et al. | ...... 411/222 |
|---|---|---|---|---|---|
| 3,942,570 | A | * | 3/1976 | Bochman et al. | ........... 411/220 |
| 4,431,043 | A | * | 2/1984 | Goodell et al. | ............. 152/417 |
| 4,626,111 | A | * | 12/1986 | Swasey et al. | ................ 384/99 |
| 5,174,839 | A | * | 12/1992 | Schultz et al. | .............. 152/415 |
| 5,190,355 | A | * | 3/1993 | Hobbie et al. | ........... 301/105.1 |
| 5,533,794 | A | * | 7/1996 | Faison | ..................... 301/105.1 |
| 5,538,330 | A | * | 7/1996 | Ehrlich | .................... 301/124.1 |
| 5,560,687 | A | * | 10/1996 | Hagelthorn | .............. 301/105.1 |
| 5,772,373 | A | * | 6/1998 | Cronin et al. | ................ 411/120 |
| 5,795,037 | A | | 8/1998 | Hagelthorn | .............. 301/124.1 |
| 6,000,763 | A | | 12/1999 | Stevens | .................... 301/108.5 |
| 6,027,423 | A | | 2/2000 | Bell | ............................ 485/246 |
| 6,062,737 | A | | 5/2000 | Thienes | ...................... 384/589 |
| 6,203,114 | B1 | * | 3/2001 | Ehrlich | .................... 301/124.1 |
| 6,254,196 | B1 | * | 7/2001 | Gee | ......................... 301/124.1 |
| 6,467,853 | B1 | | 10/2002 | Swartzendruber et al. | ..................... 301/111.04 |
| 6,477,927 | B1 | | 11/2002 | Albo et al. | .................. 82/1.11 |

* cited by examiner

Primary Examiner—Russell D. Stormer
(74) Attorney, Agent, or Firm—Gifford, Krass, Groh, Sprinkle, Anderson & Citkowski, PC

(57) ABSTRACT

An interlocking nut and washer system exhibits a very high degree of inherent mechanical stability. The preferred embodiment includes an inner washer, an adjustment nut, an intermediate washer, and an outer nut completing an interlock assembly. Although the inner washer is technically optional, use thereof does reduce wear on the inner nut. While the invention maybe applied in different ways, the system is particularly suited to the controlled adjustment of tapered roller wheel bearings. In this case the system is provided on the spindle ends of an axle, which mounts a wheel assembly that includes tapered roller bearings.

19 Claims, 5 Drawing Sheets

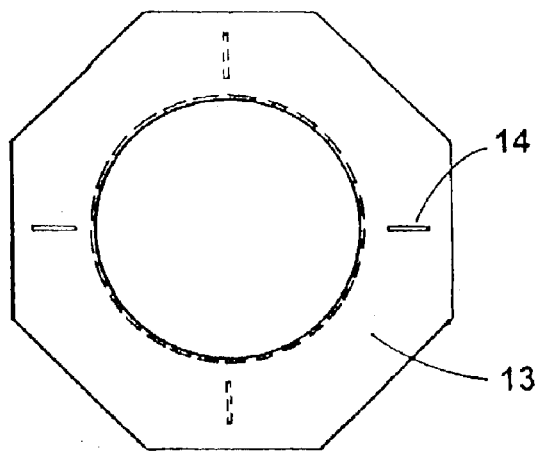
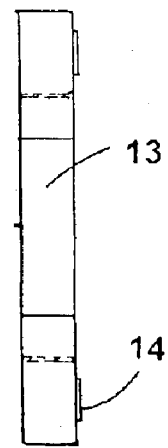
FIG. 10
FIG. 11
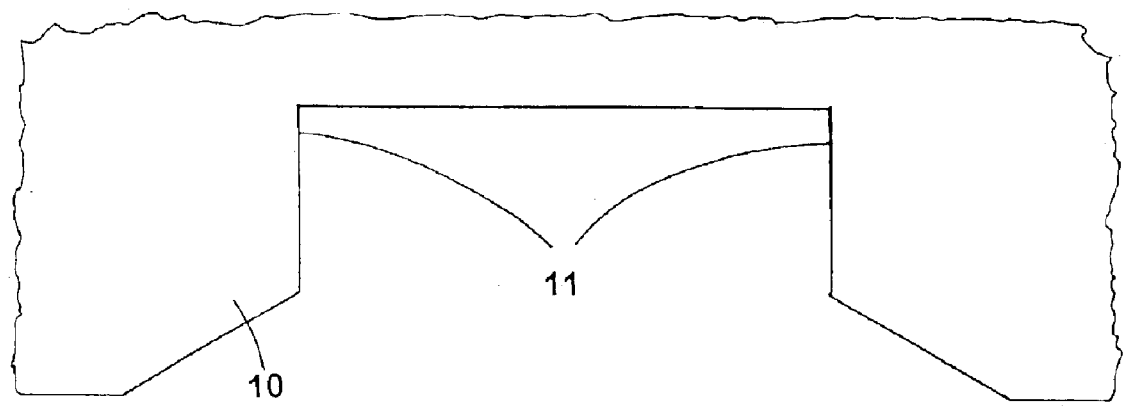
FIG. 12
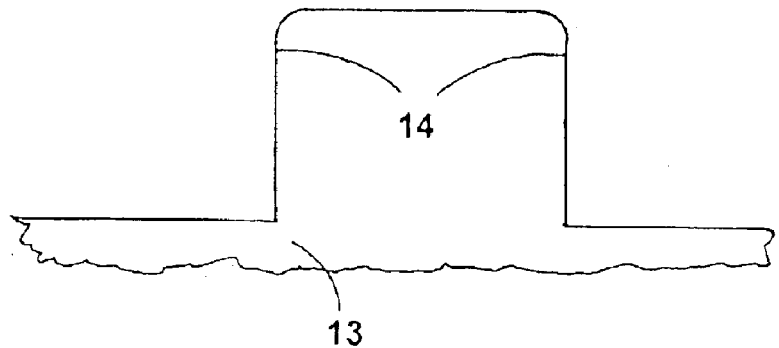
FIG. 13

HIGH-INTEGRITY INTERLOCKING NUT AND WASHER SYSTEM

FIELD OF THE INVENTION

This invention relates generally to mechanical interlocks for threaded axles, and the like and, more particularly, to a high-integrity nut and washer system finding utility in applying and maintaining a desired preload compression condition against roller bearings.

BACKGROUND OF THE INVENTION

The need to safely install wheels on tractor/trailer combination vehicles has long been recognized, and numerous solutions have been made available. In 1962, a major producer of highway trailers introduced a new industry axle having a wheel retention system consisting of a single nut held in place by a cotter pin. Wheel installation using this single nut design was merely to tighten the wheel assembly in place and then back off the single nut to a position of loose clearance before placing the cotter pin in position to prevent rotational movement.

A potential weakness with all single nut designs is the inability to consistently eliminate all degrees of freedom between the threads of the spindle and those of the nut. Several tapered roller bearing manufacturers advised that a controlled amount of preload within the tapered roller bearings wheel assembly was not only acceptable, but it would be recommended if an accurate means could be achieved for that purpose. However, no known double nut configuration was capable of providing any measure of controlled preload on tapered roller bearings. In achieving the final jammed condition between the two nuts involved, it was always the case that the outer nut had to be tightened against the inner nut and during that process, additional pressure was brought to bear against the bearings.

The amount of additional preload pressure is related to the amount of clearance between the threads of the inner nut and the threads of the spindle. The tolerances of manufactured threads on axle nuts were so variable that inconsistent preload pressures would occur as a result of the inward movement of the inner nut through the space or lash between mating threads as the outer nut was tightened into the jammed condition. For this reason, the recommended practices by all manufacturers for installation of double nuts on tractor/trailer applications call for a back off of the inner nut prior to installing and tightening the outer nut.

My U.S. Pat. No. 5,795,037 describes a novel axle nut system adapted for use on the spindle ends of an axle which mounts a wheel assembly that includes tapered roller bearings. The system includes an adjustment nut, a washer and a retainer member. The adjustment nut is threaded into position having torque applied to it in a controlled manner to achieve specific preload bearing pressure against the outer bearings. Thereafter, the washer is placed into contact with the nut and is rotationally fixed with respect to the axle. Next, the threaded retainer member is rotated into contact with the washer.

With the threaded retainer member placed on the axle to prevent any outward movement of either the wheel assembly components or the adjustment nut and washer, the adjustment nut is rotated in the opposite direction by which it was installed until it jams forcibly against the washer and thus, the threaded retainer member. With this rotational movement of the adjustment nut, the original bearing pressure or preload exerted outward against the adjustment nut is transferred and bears against the washer and retainer member.

Since this patent issued, a number of different lock members have been tried in the interest of achieving the best tradeoff between reliability and convenience of installation. These various methods included bend-over tabbed washers, and the use of a setscrew to associate the retainer nut with the intermediate washer that engages the keyway of the axle spindle. Both of these systems were used over the course of the last several years, but both were also criticized by those who perform the installation procedure.

The use of the bend-over tabbed washer was somewhat compromised because it was necessary for the washer to be thin enough to facilitate bending yet strong enough to prevent shearing of the tab within the keyway at the time the inner adjustment nut was jammed outward against the outer nut or lock member. The finally selected thickness provides dependable resistance against shearing, but it was too thick to facilitate ease of bending of the locking tab over the outer nut. Also, the use of the bend-over tab was difficult because space constrictions within the hub cavity complicated assembly and disassembly operations.

SUMMARY OF THE INVENTION

This invention improves on the existing art by providing an interlocking nut and washer system exhibiting a very high degree of inherent mechanical stability. The preferred embodiment includes an inner washer, an adjustment nut, an intermediate washer, and an outer nut completing an interlock assembly. The configuration is based on the recognition that the retainer nut will positively engage with the intermediate washer using the backup force caused when the inner adjustment nut is rotated in the opposite direction. As a result, a physical locking interaction occurs between the outer nut and the intermediate washer in a manner not previously provided by any jam nut fastening system. Although the inner washer is technically optional, use thereof does reduce wear on the inner nut.

While the invention maybe applied in different ways, the system is particularly suited to the controlled adjustment of tapered roller wheel bearings. In this case the system is provided on the spindle ends of an axle, which mounts a wheel assembly that includes tapered roller bearings. After positioning the tabbed inner washer to engage within the spindle keyway while abutting against the outer tapered roller bearing, the adjustment nut is threaded into position having torque applied to it in a controlled manner to achieve the intended installation adjustment.

Either a slight dimensional clearance between the inner washer and the adjustment nut can be provided, or a specific preload bearing force against the outer tapered roller bearing can be applied. Thereafter, the intermediate washer that has interlock capability with the outer nut is positioned on the axle and is rotationally fixed with respect to spindle keyway engagement.

In the preferred embodiment, the locking mechanism involves a plurality of radially oriented grooves on the face of the intermediate washer and a projection on the face of the outer retainer nut. It will be appreciated that other interlocks may be used, such as dimples and divots, and that the projection may be provided on the washer with the corresponding receptacle on the nut. Recesses on the washer are preferred, however, as they can be placed on both side of washer while maintaining otherwise smooth faces. Projections are likewise preferably provided on both sides of the outer nut so that it, too, can be placed on the threads in either direction.

In use, the projection on the face of the threaded retainer nut is moved into interlocking contact within a slot on the contact face of the intermediate washer. This is accomplished by tightening the retainer nut against the contact face of the intermediate washer, causing the projection on the contact face of the retainer member to penetrate into the space of a slot. Using this procedure, the installer should sense the interference of the projection within the slot. With an additional amount of torque on the retainer member, the projection will be caused to separate from the initial slot and to rotate onward to engage the second slot of the intermediate washer.

If penetration of the retainer projection does not prevent further rotation of the retainer, it will disengage from the second slot and will progress to the third slot. At this point, it will become locked in place due to being positively engaged with the immovable intermediate washer. With the amount of penetration of the retainer projection into the third slot resulting from a designed maximum inward thread movement, the retainer projection will be prevented from disengaging from that slot even if significant torque is applied to the retainer. This constitutes an automatic position sensing arrangement that prevents the retainer nut from being tightened excessively. At this point, the inner adjustment nut is caused to rotate "in the second direction," firmly jamming the inner adjustment nut, the intermediate washer, and the outer retainer into a locked condition. Having secured the three locking components forcefully together, it is not possible for the outer retainer to be moved because the projection within the slot of the intermediate washer prevents any rotation without shearing the projection.

This invention was conceived in recognition of the problems associated with tractor/trailer combination vehicles and appropriate designs have been formulated for the basic axle spindles commonly used. Applications of the principles of this invention described for the preferred embodiment makes it possible to standardize the wheel retention system on tractor/trailer combination vehicles providing control adjustment of tapered roller bearing preload or endplay at the three axle positions on the vehicle; the steer axle or the tractor, the drive axles of the tractor, and the axles of the trailer.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which:

FIG. 10 is a plan view of the interlocking retainer member that shows a plurality of projections on both face surfaces designed to engage within the slots on the intermediate interlocking washer shown in FIG. 8;

FIG. 11 is a side view of the internal interlocking retainer member shown in FIG. 10;

FIG. 12 is an enlarged section view taken of one of the slots shown in the plan view FIG. 8 of the intermediate interlocking washer;

FIG. 13 is an enlarged section view taken of one of the projections shown in the plan view FIG. 10 of the interlock retainer nut;

DETAILED DESCRIPTION OF THE INVENTION

Figure 1:
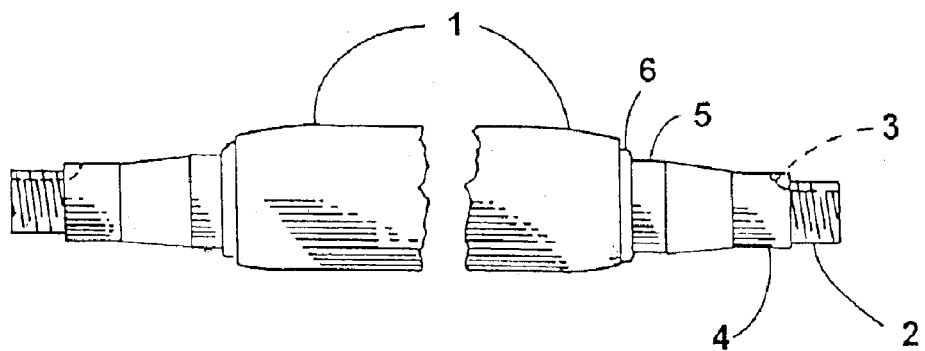
FIG. 1 is a plan view of an axle beam without any accouterments showing the two spindles in final form following the machining operations.
Figure 2:
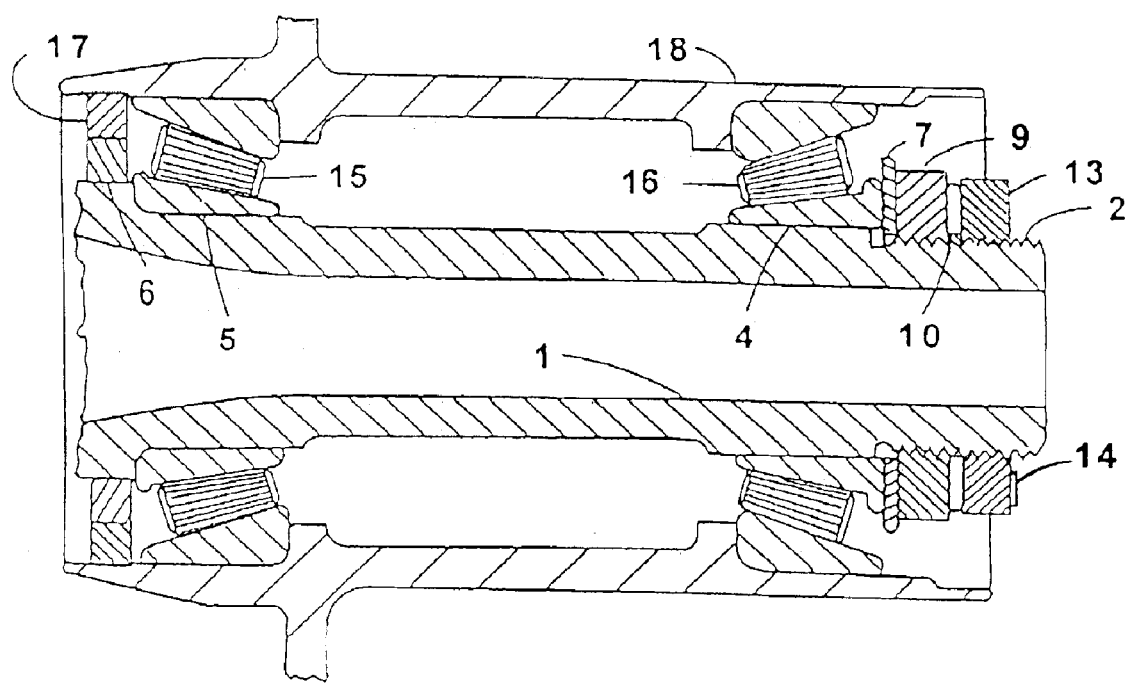
FIG. 2 is a section view of the axle spindle in FIG. 1 having assembled thereon the components comprising the wheel and axle assembly, which includes an inner washer, an inner means, an intermediate interlocking washer, and an outer interlocking means, showing the respective relationship of all members in their final assembled positions.

Reference is now made to the Drawings, wherein FIG. 1 depicts a prior-art axle beam 1 having conventional threads 2, a washer keyway 3, an outer bearing journal 4, an inner bearing journal 5 and an oil seal surface journal 6. Referring to FIG. 2, an oil seal 17 is shown in its respective position mounted between wheel or hub 18 and the axle spindle 1. Inner tapered roller bearing 15 is positioned between the wheel or hub 18 and the bearing journal 5. An outer tapered roller bearing 16 is also positioned in its working arrangement between the wheel or hub 18 and the outer bearing journal 4 of the axle spindle 1.

Figure 3:
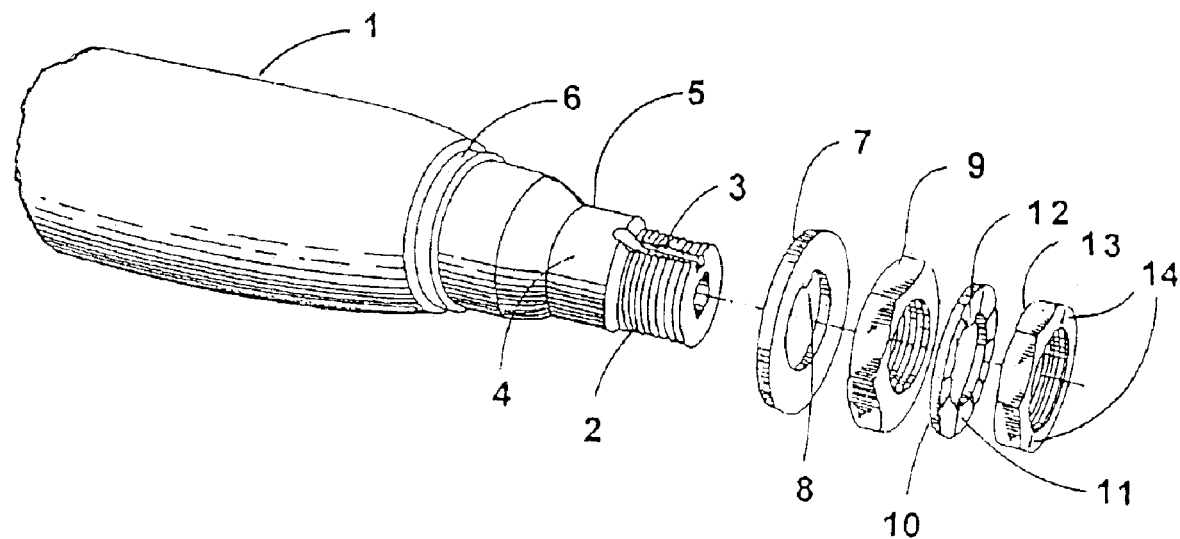
FIG. 3 is an exploded perspective view of the components of the preferred embodiment of the axle nut system of the present invention that includes an inner washer, an inner member, an intermediate interlocking washer and an interlocking retainer member.
Figure 4:
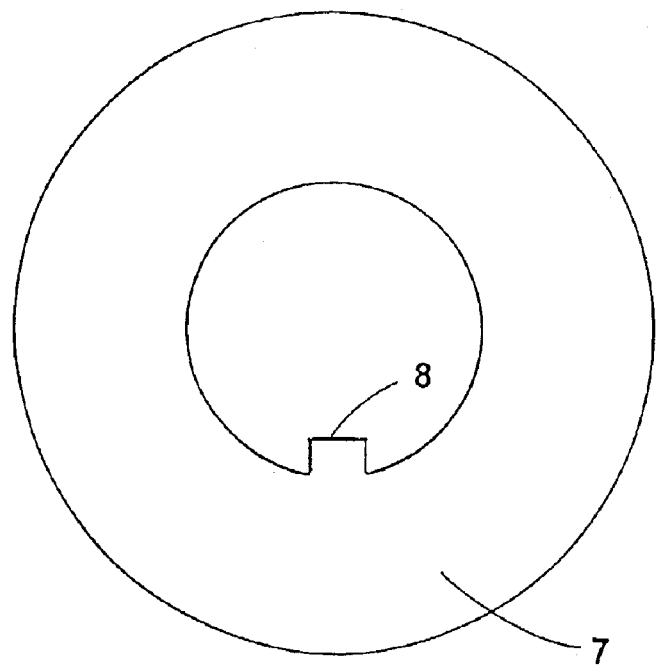
FIG. 4 is a plan view of the stationary inner washer that is positioned on the axle spindle between the inner means and the inner race of the outer tapered roller bearing.
Figure 5:
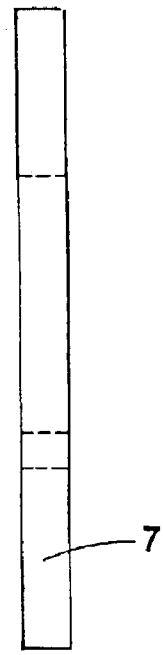
FIG. 5 is the side view of the stationary inner washer shown in FIG. 4.
Figure 6:
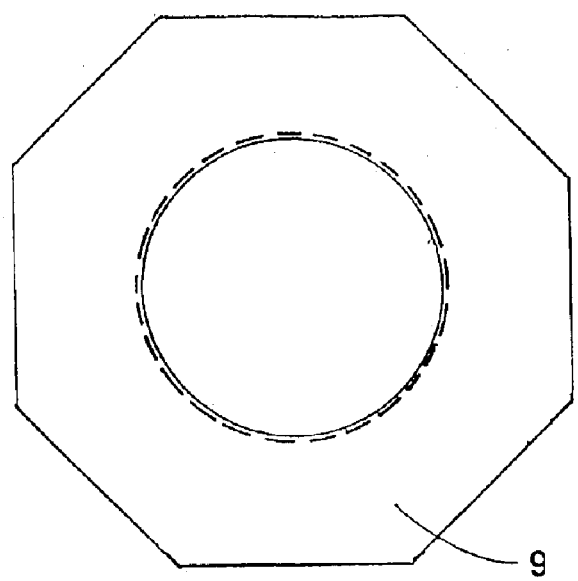
FIG. 6 is a plan view of the inner means that is depicted as a nut with threads to engage the spindle threads.
Figure 7:
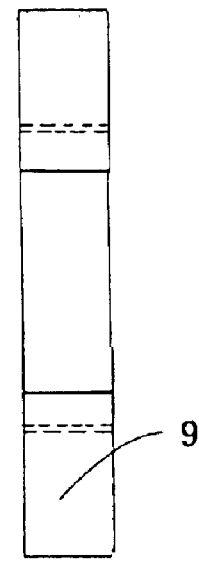
FIG. 7 is a side view of the nut shown in FIG. 7.

The invention will now be described in conjunction with the prior-art components introduced with respect to FIGS. 1 and 2. FIG. 3 is an exploded, perspective view showing the components of the preferred embodiment, which include an inner, hardened washer 7, an adjustment nut 9, an intermediate interlocking washer 10, and an interlocking retainer nut 13, all mountable on the axle spindle 1. The inner hardened washer is also shown in FIGS. 4 and 5, and the adjustment nut 9 is shown in FIGS. 6 and 7.

Figure 8:
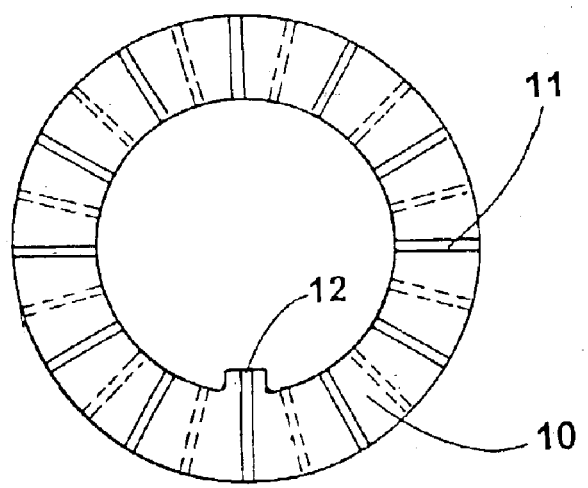
FIG. 8 is a plan view of the intermediate interlocking washer having a plurality of slots equally spaced on both faces to accept the projections provided on the face surfaces of the interlocking retainer member.
Figure 9:
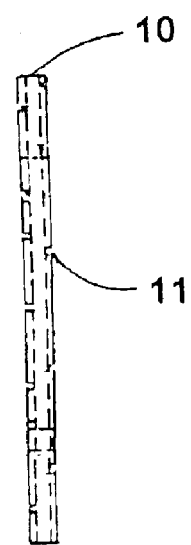
FIG. 9 is a side view of the intermediate interlocking washer shown in FIG. 8.

The spindle keyway 3 serves to engage an inner projection 12 of the intermediate interlock washer 10 that is shown in detail in FIGS. 8 and 9. Slots 11 on the face surfaces of the intermediate interlock washer 10 depicted in FIGS. 8, 9, and 12 serve to engage a projection or projections on the faces of the threaded interlock retainer nut 13 shown in detail in FIGS. 10, 11, and 13.

The assembly process provides for placement of the inner washer 7 around the threaded diameter 2 of the axle spindle 1 with the tab 8 engaged with the keyway 3. This is followed by placement of the adjustment nut 7 in position to be tightened with a specific amount of torque applied by a calibrated torque wrench (not shown). The amount of installation torque applied by the torque wrench complies with the recommendations that correlate with the relative amount of preload force against the inner and outer tapered roller bearings 15 and 16 advocated by bearing manufacturers for reliable and safe operation. Having established the desired preload bearing force by controlled tightening of the adjustment nut 9, the intermediate interlock washer 10 is placed around the spindle diameter 2 to engage its tab 12 within the spindle keyway 3.

Figure 14:
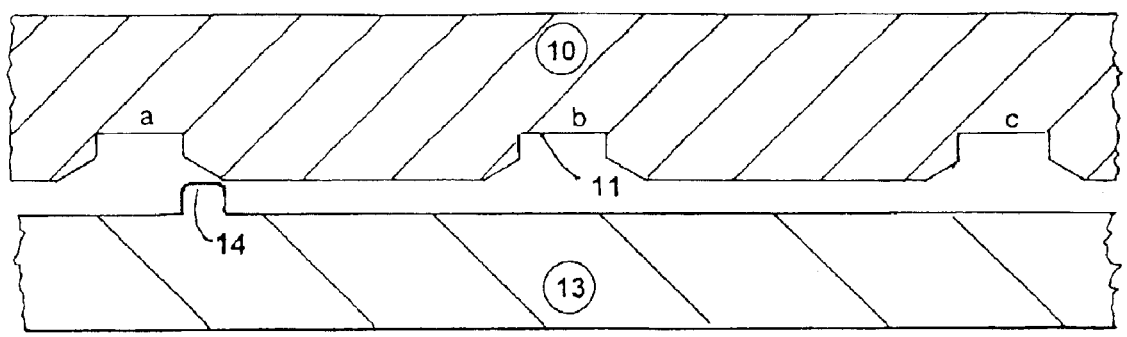
FIG. 14 is an enlarged scale side section view of a typical projection on either face of the interlocking retainer member shown in FIG. 10 showing its relativity to a typical slot shown on either face of the intermediate interlocking washer shown in FIG. 8 before contact is made as the result of inward movement of the interlocking retainer member on the mating threads of the spindle shown in FIG. 3.
Figure 15:
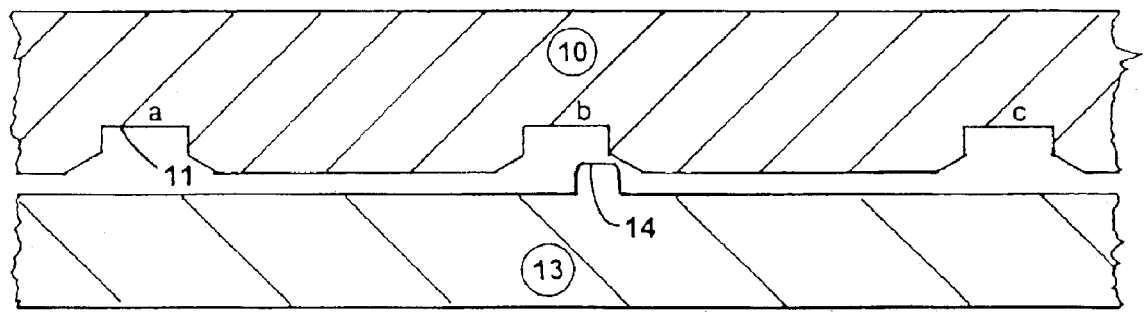
FIG. 15 is an enlarged scale side section view of same members shown in FIG. 14 after tightening rotation of the interlocking retainer member has caused it to progress from its original position relative to the first slot to its relative position with respect to the second slot.
Figure 16:
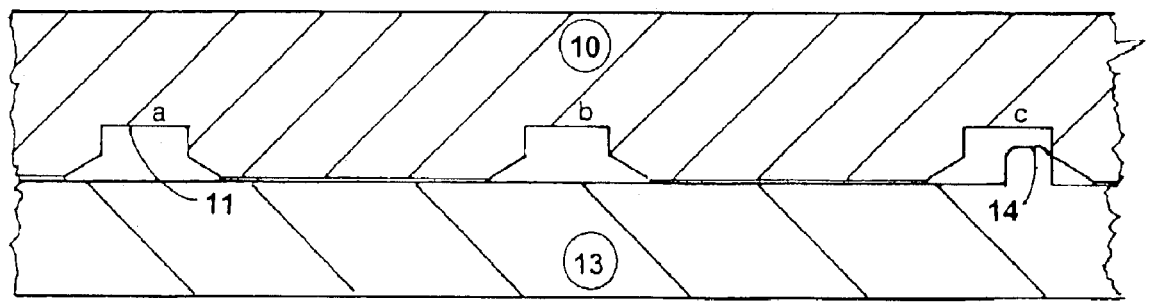
FIG. 16 is an enlarged scale side section view of the same members shown in FIGS. 14 and 15 after tightening rotation of the interlocking retainer member has caused it to move further inward from its position relative to the second slot to its realigned position with respect to the third slot.

The result of tightening interlock retainer nut 13 is illustrated in FIGS. 14, 15, and 16. Of interest is to recognize the relationship of the interlock retainer nut projection 14 with respect to encountering a series of three slots 11 as the result of this tightening operation. As interlock retainer nut 13 is tightened and moves inward toward the outer face of the intermediate interlock washer 10, the interlock retainer nut projection 14 moves inward with respect to the first slot 11, defined as "a" as shown in FIG. 14.

After positioning with respect to slot 11a of the intermediate interlock washer 10 is sensed, the interlock retainer nut 13 may become positioned with respect to the intermediate interlock washer 10 by continuing to rotate it to a position with respect to the subsequent slot 11b. Although the interlock retainer nut projection 14 is positioned within the cavity of slot 11b as shown in FIG. 15, its location against the sloped surface of slot 11b has not penetrated deeply enough to cause restraint further rotational movement.

Moving onward with slightly increased torque, retainer nut 14 and its interlock retainer nut projection will be further rotated and will come to rest after it reaches slot 11c as shown in FIG. 16. At this stage of the assembly process, interlock retainer nut 13 cannot be rotated further because the additional depth of engagement of the interlock retainer nut projection 14 within interlock washer slot 11c will not allow disengagement as the projection 14 as it is no longer in contact with the sloped or angled surface of the slot.

With the interlock retainer nut projection 14 being in a captured position within the slot 11c, and because the intermediate interlock washer key tab 12 is engaged within the spindle keyway 3, the intermediate interlock washer 10 and the adjoined and connected internal retainer nut 13 are relatively secure. The assembly becomes absolutely secure with the follow-up step by which the inner adjustment nut 9 is rotated in the opposite direction by which it was originally installed and is caused to bear outward against the intermediate interlock washer 10. With the ensuing jammed condition caused by an appropriate amount of torque applied to the adjustment nut 9, further movement of the assembled wheel end fastener system is not possible until the outward force imposed by adjustment nut 9 is relieved with a reversed manual torque application to transfer the applied force imposed by the adjustment nut 9 axially inward.

Disassembly of the interlock retainer nut 12 and the intermediate interlock washer 10 cannot be accomplished until the outward jamming force applied to the interlock retainer nut 13 is relieved. The adjustment nut 9 must be rotated away from the intermediate interlock washer 10 before it becomes possible to disengage the interlock retainer nut projection 14 from within the intermediate interlock slot 11. This must be accomplished before the wheel end interlocking retainer system can be disassembled.

The unique provision of a securely jammed connection of the intermediate interlock washer 10 to the interlock retainer nut 13 was designed to achieve correlated action between the axial penetration of the interlock retaining nut 13 and its interlock retainer nut projection 14 with the amount of rotational travel of the interlock retainer nut projection 14 between adjoining intermediate interlock washer slots 11. Nevertheless, the profile configuration of the interlock retainer nut projection 14 remains compatible with the shape of the intermediate interlock washer slot 11 as shown in FIGS. 12 and 13.

Referring once again to FIGS. 14, 15, and 16, the interlock retainer nut projection 14 progressively engages three appropriately spaced intermediate interlock washer slots 11 before becoming restricted from further rotational movement. Only by appropriately dimensioning the intermediate interlock washer slots 11, will the retainer nut interlock projection 14 be allowed to progress past two initial slots before penetrating sufficiently into the third slot where disengagement becomes possible. After the vertical face of the retainer nut interlock projection 14 engages the vertical face of the intermediate interlock washer slot 11 as shown in FIG. 16, further rotational movement of the retainer nut interlock projection becomes securely restrained because the intermediate interlock washer key tab 12 shown in FIG. 8 is engaged within spindle keyway 3 shown in FIG. 1.

The correlated relationship between the axial movement of the retainer nut interlock projection 14 with respect to the amount of selected spacing of the intermediate interlock washer slots 11 is complex. For any given combination of thread pitch and spindle diameter, the ultimate design solution must also account for the dimensional considerations of the most appropriate profiles of both the retainer nut interlock projection 14 and the intermediate interlock washer slot 11. The number of variables involved accordingly prevents assignment of absolute dimensional values.

Although the invention is primarily concerned with the application of a definitively controlled preload force on the tapered roller bearings, other purposes can be served. A number of vehicle operators prefer to install wheels on their tractor/trailer combination vehicles providing some actual clearance between the adjustment and the outer face of the outer bearing before securing the wheel assembly on the axle. This procedure is easily accomplished by backing off the adjustment nut for a measured rotation from the position where resistance to installation torque is first sensed before installing the intermediate interlock washer and retainer nut Recommended procedures and standard operating practices for this purpose are well defined in the instructions provided from a number of sources in the trucking industry.

Having described the principles of this invention as being directed for application to tractor/trailer combination vehicles, it is anticipated any automotive vehicle will benefit by having wheels mounted and the wheel bearings similarly adjusted using the means described. Other applications may include various forms of rotating machinery.

While the preferred embodiment of the present invention are shown and described, it is envisioned that those skilled in the art may devise various modifications of the present invention without departing from the spirit and scope of the appended claims.

I claim:

1. A retaining system for establishing and maintaining a desired degree of preload force relative to roller bearings mounted on a threaded axle having a predetermined pitch, comprising, in order closest to the bearings:
   an inner adjustment nut;
   an intermediate washer having an outer face providing the first portion of a mechanical interlock;
   an outer retainer nut having an inner surface providing the second portion of the mechanical interlock; and
   wherein the first portion of the mechanical interlock includes a plurality of spaced-apart physical features related to the predetermined pitch, such that tightening the outer retainer nut causes the second portion of the mechanical interlock to become progressively trapped by one of the features.

2. The retaining system of claim 1, wherein:
   the physical features are indents; and
   the second portion of the mechanical interlock is a raised projection dimensioned to be trapped by one of the indents.

3. The retaining system of claim 1, wherein:
   the physical features are radially oriented indents; and
   the second portion of the mechanical interlock is a radial projection dimensioned to be trapped by the one of the indents.

4. The retaining system of claim 1, wherein:
   the physical features are grooves extending radially outwardly on the outer face of the intermediate washer; and
   the second portion of the mechanical interlock is a radial projection dimensioned to be trapped by one of the grooves.

5. The retaining system of claim 1, wherein:
   the intermediate washer has a pair or opposing faces; and
   both faces include the first portion of the mechanical interlock, enabling the intermediate washer to be placed on the axle with either face first.

6. The retaining system of claim 1, wherein:
   the outer retainer nut has a pair or opposing faces; and
   both faces include the second portion of the mechanical interlock, enabling the outer retainer nut to be placed on the axle with either face first.

7. The retaining system of claim 1, wherein the intermediate washer includes a tab to be received by a keyway in the axle.

8. The retaining system of claim 1, further including an inner washer between the inner adjustment nut and the bearings.

9. The retaining system of claim 1, wherein the intermediate washer includes a tab to be received by a keyway in the axle.

10. A method of providing a preload force to a set of roller bearings mounted on a threaded axle, comprising the steps of:
    providing the system of claim 1;
    tightening the inner adjustment nut against the bearings until a desired preload force is achieved; and
    tightening the outer retainer nut until the mechanical interlock is engaged.

11. The method of claim 10, further including the step of backing off the inner nut toward the outer retainer nut to tightly sandwich the intermediate washer therebetween.

12. A retaining system for establishing and maintaining a desired degree of preload force relative to roller bearings mounted on an axle having threads of a predetermined pitch and a keyway, comprising in order closest to the bearings:
    an inner washer with a tab received by the keyway;
    an inner adjustment nut;
    a tabbed intermediate washer having an outer face with a plurality of spaced apart, radially directed grooves;
    an outer retainer nut having an inner surface with at least one projection; and
    wherein the spacing between the grooves is such a way that the projection interacts with two of the grooves when the outer retainer nut is tightened before finally interlocking with one of the grooves.

13. The retaining system of claim 12, wherein the tabbed intermediate washer has two faces, both of which include a plurality of radially directed grooves, allowing the washer to be placed on the axle either way.

14. The retaining system of claim 12, wherein the outer retainer nut has two faces, both of which include at least one projection, allowing the nut to be placed on the axle either way.

15. A method of providing a preload compression to a set of roller bearings mounted on a threaded axle, comprising the steps of:
    providing the system of claim 12;
    tightening the inner adjustment nut against the bearings until a desired preload force is achieved; and
    tightening the outer retainer nut until the projection finally interlocks with one of the grooves.

16. The method of claim 15, further including the step of backing off the inner nut toward the outer retainer nut to tightly sandwich the intermediate washer therebetween.

17. A retaining system for establishing and maintaining a desired degree of preload force, comprising:
    an axle protruding through a set of roller bearings terminating in an end having threads with a predetermined pitch and a keyway;
    an inner tabbed washer on the axle closest to the bearings;
    an inner adjustment nut on the threads abutting the inner tabbed washer;
    a tabbed intermediate washer abutting the inner adjustment nut;
    an outer retainer nut abutting the tabbed intermediate washer; and
    wherein the tabbed intermediate washer includes a plurality of spaced apart, radially directed grooves and the outer retainer nut includes at least one projection; and
    wherein the spacing between the grooves is related to the pitch in such a way that the projection interacts with two of the grooves when the outer retainer nut is tightened before finally interlocking with one of the grooves, resulting in a high integrity mechanical interlock when the nuts are tightened to achieve a desired degree of preload force on the bearings.

18. The retaining system of claim 17, wherein the tabbed intermediate washer has two faces, both of which include a plurality of radially directed grooves, allowing the washer to be placed on the axle either way.

19. The retaining system of claim 17, wherein the outer retainer nut has two faces, both of which include at least one projection, allowing the nut to be placed on the axle either way.

* * * * *